United States Patent [19]
Masak et al.

[11] 3,858,218
[45] Dec. 31, 1974

[54] ANTENNA SYSTEM FOR RADIATING DOPPLER CODED PATTERN, USING SEQUENTIAL MODAL EXCITATION

[75] Inventors: Raymond J. Masak; Herbert F. Baurle, both of East Northport, N.Y.

[73] Assignee: Hazeltine Corporation, Greenlawn, N.Y.

[22] Filed: Apr. 3, 1973

[21] Appl. No.: 347,504

[52] U.S. Cl. ...343/106 D, 343/100 SA, 343/113 DE, 343/854
[51] Int. Cl. ............................................. G01s 1/38
[58] Field of Search ... 343/106 D, 100 SA, 113 DE, 343/854

[56] References Cited
UNITED STATES PATENTS
3,754,259   8/1973   Redlich .................... 343/106 D
3,774,222   11/1973  Charlton .................. 343/113 DE
3,775,773   11/1973  Nemit ..................... 343/108 M

OTHER PUBLICATIONS

Sheleg, "A Matrix-Fed Circular Array for Continuous Scanning," IEEE, Proceedings, Vol. 56, No. 11, Nov. 1968, pp. 2016–2027.

Primary Examiner—Maynard R. Wilbur
Assistant Examiner—Richard E. Berger

[57] ABSTRACT

Disclosed is an antenna system for radiating a Doppler coded pattern, wherein the frequency of radiation varies with a component of direction from the antenna. The antenna may comprise a circular array wherein the orthogonal modes of the array are sequentially excited with wave energy signals. A suitable method for exciting these modes using a Butler matrix is described. Other embodiments are also disclosed.

7 Claims, 2 Drawing Figures

ANTENNA SYSTEM FOR RADIATING DOPPLER CODED PATTERN, USING SEQUENTIAL MODAL EXCITATION

CROSS REFERENCE TO RELATED APPLICATIONS

This invention relates to an antenna system for Doppler coding a region of space. Other systems for Doppler coding are described in co-pending application Ser. No. 347,507, filed Apr. 3, 1973, entitled "Array Antenna for Radiating Doppler Coded Pattern Using Phase Control" and Ser. No. 347,506, filed Apr. 3, 1973 entitled "Antenna System for Radiating Doppler Coded Pattern Using Multiple Beam Antenna," which are assigned to the same assignee as the present application.

BACKGROUND OF THE INVENTION

This invention relates to systems for determining the angular position of a target with respect to a reference location. In particular this invention relates to systems which use a frequency coded pattern to perform angle measurement, also known as "Doppler" systems. In a Doppler system an antenna radiates wave energy into a region of sapce in a pattern wherein the frequency of radiation varies with one of the angular components of direction from the antenna. Frequency coded radiation has in the past been achieved by radiating wave energy sequentially from the individual antenna elements of an array. This causes apparent motion of the radiation source, resulting in a "Doppler" frequency shift which depends on the relative angle of the observer with respect to the antenna.

In some systems using Doppler patterns for angle measurement, it is desirable to have antennas which provide frequency coding of the component of angular direction measured in a selected plane. This is achieved by using an array of elements arranged on a circular arc, with the circular arc being located in the desired reference plane. Sequentially supplying wave energy signals of constantly increasing frequency to the elements of a circular array will result in the desired radiation patterns. However, this technique has a disadvantage since usually not all elements will be capable of radiating wave energy in all directions within a desired region of space. Consequently, there will be directions in which radiation occurs during only a portion of the period of sequential excitation in such cases. This results in a directionally dependent time ambiguity of the radiated signal in those directions.

Boris Sheleg in an article entitled "A Matrix Fed Circular Array for Continuous Scanning," Proceedings of the IEEE, Vol. 56, No. 11, November 1968 describes the orthogonal modes of a circular or cylindrical array and the use of a Butler matrix for the excitation of these modes. However, Sheleg shows a system which uses the continuous excitation of all the modes to form a directional antenna beam. Each of the cylindrical modes has a phase variation around the circular array which is an integral multiple of 360°.

SUMMARY OF THE INVENTION

An object of the present invention, therefore, is to provide an antenna system for radiating a Doppler coded pattern from a circular array.

A further object of the present invention is to provide such an antenna system wherein the Doppler coding occurs simultaneously for all directions within a desired region of space.

A still further object of the present invention is to provide such a system by sequentially exciting the orthogonal modes of a circular array.

In accordance with the present invention there is provided an antenna system for radiating wave energy signals into a region of space during a selected time period and in a desired radiation pattern. The radiation pattern is one in which the radiated frequency varies with at least a component of angular direction from the antenna system measured in a selected plane. The antenna system includes an array of antenna element columns, arranged along a circular arc in said plane, for radiating supplied wave energy signals. The columns comprise one or more antenna elements and means for coupling supplied wave energy signals to the elements. The antenna system also includes means for supplying a sequence of pulse type wave energy signals to each of the columns simultaneously during the time period. The phase difference between pairs of corresponding signals in the sequences supplied to any two adjacent columns must be equal to a different integral multiple of the angular separation of the columns for each of the pairs. When these sequences of wave energy signals are supplied to the elements, the antenna system radiates the desired radiation pattern.

For a better understanding of the present invention, together with other and further objects thereof, reference is had to the following description taken in conjunction with the accompanying drawings, and its scope will be pointed out in the appended claims.

DESCRIPTION AND OPERATION OF THE FIG. 1 ANTENNA SYSTEM

Figure 1:
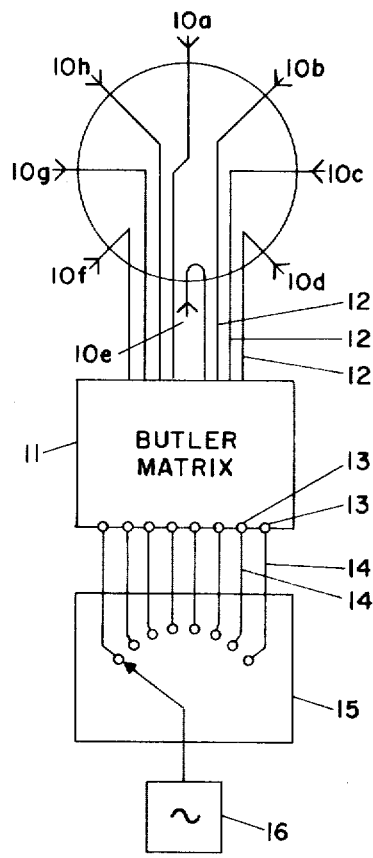
FIG. 1 is one embodiment of an antenna system constructed in accordance with the present invention.

The antenna system of FIG. 1 is a circular array of eight elements 10a and through 10h, which are equally spaced to form a complete circle. Each of the elements 10 is connected to an output of a conventional Butler matrix 11 by transmission lines 12 having equal phase lengths. The input ports 13 of Butler matrix 11 are connected by transmission lines 14 to a multi-pole switch 15. An oscillator 16 supplies wave energy signals of suitable frequency to the switch 15.

The elements 10a through 10h of the circular array may be of any suitable type such as dipoles, slotted waveguides or spirals. In some cases it may be desirable to use columns of elements instead of single elements around the circle, in which case it will, of course, be necessary to provide for coupling the supplied wave energy signal to each of the elements in a column from the corresponding transmission line 12. The transmission lines 12 connecting the elements 10 to the Butler matrix 11 may be any type suitable for use at the selected frequency of operation. These transmission lines 12 must have the same electrical phase length for wave energy signals at the frequency of operation.

The Butler matrix is well known to those skilled in the art. It is described by J. L. Butler in a chapter entitled "Digital, Matrix and Intermediate-Frequency Scanning," contained in "Microwave Scanning Antennas," Vol. 3, R. C. Hansen, Ed., New York Academic Press, 1966, ch. 3. A Butler matrix is a lossless, passive network having N input ports and N outputs, where N is usually a selected power of two. A wave energy signal supplied to any input port produces corresponding signal currents of equal amplitude on all the outputs, with constant phase difference between the signals at adjacent outputs. In the present invention this phase difference must be an integral multiple of $2\pi$ divided by the total number of outputs. The particular Butler matrix used in the FIG. 1 embodiment has eight input ports 13, which couple wave energy signals to the eight outputs with a phase difference between adjacent outputs which is an integral multiple of $\pi/4$ and ranges from $-\pi$ to $+3/4\pi$.

From an examination of the above-referenced article by J. L. Butler, it will be evident that there are many matrices which will have multiple input ports with similar coupling characteristics. Included in these are matrices which operate at intermediate frequency, that is, a frequency other than the radiated frequency. When such a device is used, means must be provided for frequency conversion at the output of the coupling device. Other non-matrix type devices can also be used to achieve the desired coupling effect such as an enclosed lens or pillbox device.

The transmission lines 14 connect the Butler matrix to a switch 15. These transmission lines should be of equal electrical length, but may have different lengths to compensate for the dispersion characteristics of the radiated modes as described below. The switch 15 should preferably be of the electronic type to provide rapid switching of input wave energy among the input ports of the Butler matrix. The rate at which the frequency of radiation of the radiated signal varies with direction from the antenna will be determined by the rate at which the switch 15 is cycled.

An alternative to the switch and oscillator combination shown in the FIG. 1 embodiment would be a tapped delay line and a source of pulse type wave energy signals. This would have the same effect of sequentially inserting pulses of wave energy into the input ports of the Butler matrix.

Figure 2:
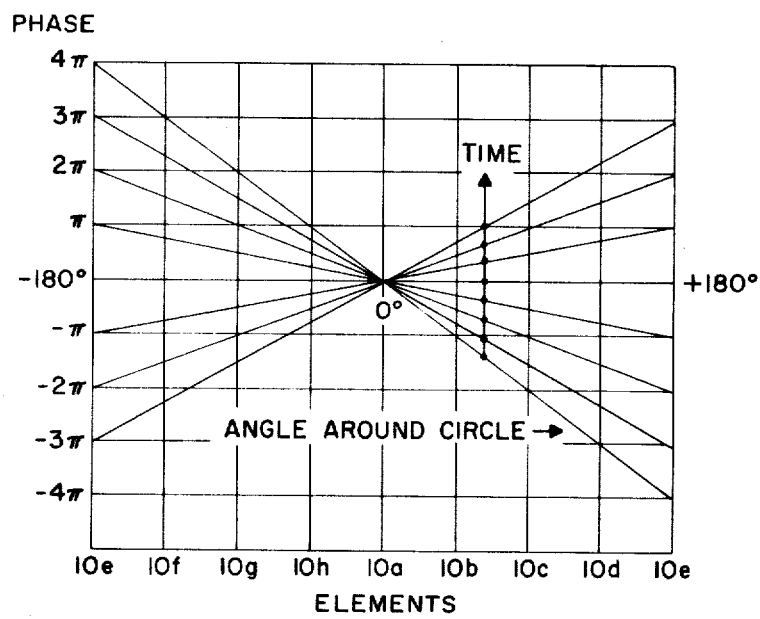
FIG. 2 illustrates the phase of the signals radiated by the antenna system of FIG. 1.

Each of the input ports 13 of the Bulter matrix corresponds to a different "mode" of the circular array. A mode is a wave energy configuration in which the phase of the wave energy varies by an integral multiple of $2\pi$ and the amplitude of the wave energy is constant around the circumference of the circle. The modes of the FIG. 1 embodiment are shown in the diagram of FIG. 2. These modes vary from the $-4$ mode to the $+3$ mode. The $+4$ mode is also possible but is, for an equally spaced arrangement of eight elements, identical to the $-4$ mode, since the variation from element to element is $\pi$. The phase of the wave energy supplied to each of the elements of the array is determined by the intersection of the mode line with the line indicating the location of the element. Element 10e is shown twice to illustrate the circular continuity of these modes. It should be noted that phases separated by $2\pi$ are identical so that the element 10e actually does have the same phase at both ends of the diagram of FIG. 2.

When the input ports 13 in FIG. 1 are sequentially connected to the oscillator 16 by switch 15 and the modes of FIG. 2 are sequentially radiated into space, as a result of this sequential switching the elements 10 of FIG. 1 have signals supplied to them with a sequentially changing phase, except for element 10a. This sequentially changing phase during the time period required for switch 15 to complete one cycle of operation causes an apparent frequency change of the radiated signal, when viewed by an observer located in the field of the array. An observer at any particular angular direction from the antenna will receive a signal whose phase sequentially changes with time, as is also shown in FIG. 2. It is apparent that the total phase change during the time period, and hence frequency shift observed, is dependent on the angle of the observer from the antenna, there being no phase change for an angle of 0° and $7\pi$ phase change for an angle of 180°.

At 180° there is discontinuity in the frequency coding since sequential modes are 180° out of phase with each other. In the angular region near 180° the frequency coding becomes ambiguous because of the large phase change with each pulse. In all other regions positive or negative frequency coding occurs and is linearly dependent on angle.

The modes described above do not propagate in the near field of the array with the same phase velocity. In order to compensate for this phase dispersion between modes the lengths of the transmission lines 14 in the FIG. 1 embodiment may be adjusted to give the required far field phase indicated in FIG. 2.

Various modifications of the sequential switching technique described above will be evident to those skilled in the art. For example, not all the modes need be employed to get frequency coding. Also, coding may be reversed in sense by reversing the sense of the sequential excitation. The frequency coding process may be repeated during a succession of time periods to provide substantially continuous frequency coding.

The spacing of the elements around the circle should be close enough so that only one mode is possible from a particular phase excitation used. Typically this spacing will be approximately a half-wave length.

It will also be evident that elements need not be provided which do not radiate in directions which it is desired to code. Thus an array could be used which constitutes only a portion of a circle. In any event a mode occurs when elements have a phase relation which is an integral multiple of their angular separation.

In describing the various embodiments above, reference has been made to transmitting antenna systems, but it will be recognized by those skilled in the art that the principles of the present invention can also be applied to receiving antenna systems. Accordingly, the appended claims shall be construed as covering both transmitting and receiving antenna systems regardless of the descriptive terms actually used therein.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An antenna system for radiating wave energy into a desired region of space during a selected time period and in a desired radiation pattern, wherein the frequency of said radiated energy within said region of space varies with a component of angular direction from said antenna system measured in a selected plane, comprising:
- an array of antenna element columns, arranged along a circular arc lying in said plane, for radiating supplied wave energy signals, said columns comprising one or more antenna elements and means for coupling supplied wave energy signals to said elements;
- means for supplying a sequence of pulse type wave energy signals to each of said columns simultaneously during said time period, the phase difference between pairs of corresponding signals in the sequences supplied to any two adjacent columns being equal to a different integral multiple of the angular separation of said columns for each of said pairs;
- thereby causing said antenna system to radiate said desired radiation pattern.

2. An antenna system as specified in claim 1 wherein said means for supplying sequences of pulse type wave energy signals comprises a plurality of wave energy input ports; means for coupling said ports to said columns, such that the phase difference of wave energy signals supplied to adjacent columns from each of the ports that are coupled to said columns is a different integral multiple of the angular separation of said columns for each of said ports; and means for supplying a sequence of pulse type wave energy signals during said time period, one to each of said ports.

3. An antenna system as specified in claim 2 wherein said columns are equally spaced along said circular arc and said means for coupling said ports to said elements comprises a Butler Matrix.

4. An antenna system as specified in claim 2 wherein said means for supplying said sequence of pulse type wave energy signals to said ports comprise a signal generator and means for switching the generated signal to each of said ports in a desired sequence.

5. An antenna system as specified in claim 2 wherein said columns comprise a single antenna element.

6. An antenna system as specified in claim 2 wherein said sequence of pulse type signals are supplied during a succession of said time periods.

7. An antenna system for radiating wave energy into a desired region of space during a selected time period and in a desired radiation pattern, wherein the frequency of said radiated energy within said region of space varies with the component of angular direction from said antenna system which lies in a plane comprising:
- a circular array, comprising a number of antenna element columns for radiating wave energy signals, which number in an integral power of two, said columns comprising one or more antenna elements and means for coupling wave energy signals to said elements and said columns having equal angular spacing to form a continuous circle;
- a Butler Matrix having a number of output ports equal to the number of said columns and connected to said columns by equal length transmission lines;
- and means for sequentially supplying wave energy signals to the input ports of said Butler Matrix during said time period;
- thereby causing said antenna system to radiate said desired radiation pattern.

* * * * *